United States Patent [19]

Mittermeier

[11] Patent Number: 4,507,103

[45] Date of Patent: Mar. 26, 1985

[54] HYDRAULIC CHAIN TENSIONER

[75] Inventor: Walter Mittermeier, Tamm, Fed. Rep. of Germany

[73] Assignee: Dr. Ing. h.c.F. Porsche A.G., Stuttgart, Fed. Rep. of Germany

[21] Appl. No.: 492,193

[22] Filed: May 6, 1983

[30] Foreign Application Priority Data

May 11, 1982 [DE]  Fed. Rep. of Germany ....... 3217632

[51] Int. Cl.³ ............................................. F16H 7/08
[52] U.S. Cl. .................................... 474/110; 474/111
[58] Field of Search ............... 474/110, 101, 111, 140, 474/104, 103, 91; 198/813; 184/15 R; 92/132

[56] References Cited

U.S. PATENT DOCUMENTS 3,626,776 12/1971 Staudinger et al. ................. 474/111
4,190,025 2/1980 Wahl ................................. 474/110 X Primary Examiner—Stephen J. Novosad
Assistant Examiner—Thuy M. Bui
Attorney, Agent, or Firm—Craig & Burns

[57] ABSTRACT

A hydraulic chain tightener with a hollow piston longitudinally movably guided within a hydraulic housing; the hollow piston is closed off at the top by a throttling plug and the hydraulic housing is to be vented by way of the channels of the throttling plug; an expansion space is formed between the throttling plug and the pressure space present at the bottom side of the hollow piston, which is closed off with respect to the pressure space by a ball check valve; during chain impacts on the hollow piston and corresponding pressure increases in the pressure space, the check valve opens and enables by pump action a rapid venting of the hydraulic housing.

4 Claims, 1 Drawing Figure

U.S. Patent     Mar. 26, 1985     4,507,103
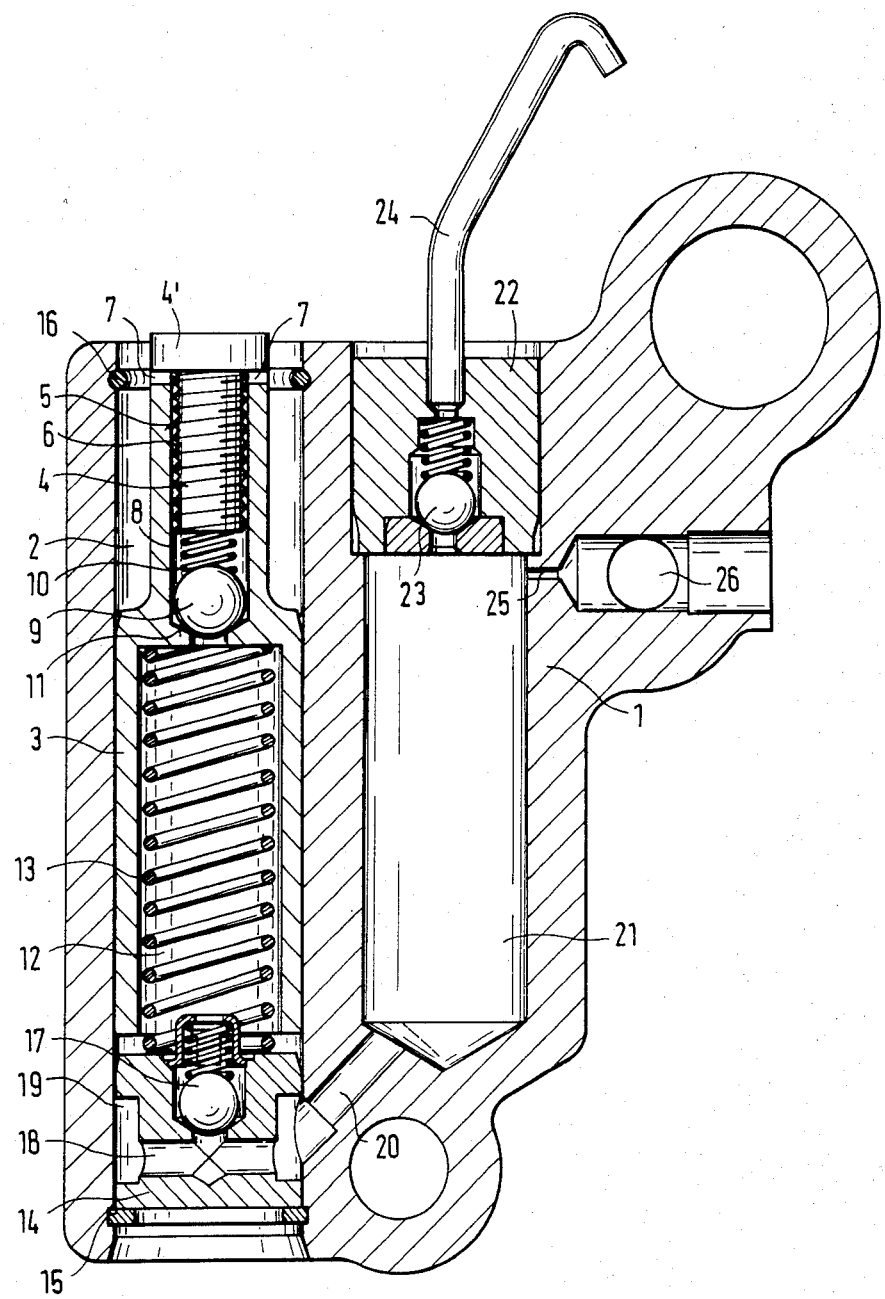

HYDRAULIC CHAIN TENSIONER

The present invention relates to a hydraulic chain tensioner for internal combustion engines with a hollow piston longitudinally movably guided in a bore of the hydraulic housing and serving as chain tensioner of the type described in German Patent Application No. P 31 45 115.2-2, corresponding to my U.S. application Ser. No. 440,956, filed Nov. 12, 1982, which has been allowed.

During practical tests of such a chain tensioner, it has been found that though a satisfactory venting is possible by way of the thread grooves of the throttling plug, a relatively large amount of time is needed therefor. As long as the venting operation is not terminated, the functioning ability of the chain tightener is impaired since by reason of the compressibility of the hydraulic-air mixture, it is not sufficiently hard in order to be able to hold the chain reliably under tension.

Accordingly, it is the object of the present invention to so construct the chain tensioner that less time is required for its venting.

The underlying problems are solved according to the present invention in that an expansion space is provided between the thottle plug and the pressure space, which is adapted to be closed with respect to the pressure space by a check valve. If the hollow piston is loaded increasingly or jerk-like, for example, by chain impacts, a considerable pressure increase up to 30 bar will result in the pressure space. This pressure peak is displaced in part into the expansion space by way of the check valve opening in that case. Consequently, a pressure difference with respect to the atmospheric pressure existing at the upper end of the throttling plug will establish itself thereat, which effects that the throttling path of the throttle plug which may be a threaded groove or an axially extending gap, is traversed with high velocity. The air, respectively, the oil-air mixture which is torn into the expansion space during the opening of the check valve, will therefore be conveyed very rapidly through the throttle plug into the atmosphere. This through-flow is additionally favored by the check valve which during its opening movement acts at the same time as displacement pump, yet prevents a return flow into the pressure space since it again closes very rapidly. Since during the operation of the chain tightener, the chain blows or impacts follow rapidly one another as found in actual experience and cause each time a pump movement, the chain tightener is vented in seconds' speeds.

In an advantageous construction of the present invention, a ball serves as check valve which is pressed by a coil spring against the valve seat provided between the pressure space and the expansion space. The ball is guided with a clearance fit in the cylindrical expansion space and can thus act when lifting off the valve seat, as displacement body for the oil-air mixture present in the expansion space.

These and other objects, features and advantages of the present invention will become more apparent from the following description when taken in connection with the accompanying drawing which shows, for purposes of illustration only, one embodiment in accordance with the present invention, and wherein:

The single FIGURE is a cross-sectional view through a hydraulic chain tightener in accordance with the present invention.

Referring now to the single FIGURE of the drawing, a hydraulic housing 1 is provided with a through-bore 2, in which a hollow piston 3 serving for the chain tensioning is longitudinally guided. The hollow piston 3 is closed off at its upper end facing the chain by a throttling plug 4 which is pressed into a smooth bore 5 of the hollow piston 3 and abuts with a collar 4' end face at the hollow piston 3. Its shank is provided with an external thread, whereby the thread grooves 6 extend over the entire shank and terminate below the collar abutment in radial channels 7 of the hollow piston 3 which establish a connection with the atmosphere. An expansion space 8 is formed underneath the throttle plug 4, in which is arranged a check valve consisting of a ball 9 and of a coil spring 10. The coil spring 10 abutting at the end face of the throttle plug 4 presses the ball 9 against its check valve seat 11 and thus closes the expansion space 8 with respect to the cylinder pressure space 12 formed in the hollow piston and located on the other side of the check valve seat 11. The hollow piston 3 is stressed from below by a coil spring 13 which is arranged in the cylindrical pressure space 12 and is supported against a mounting member 14 which is pressed into the bore 2 of the hydraulic housing from below and is additionally retained thereat by a retaining ring 15. In the upward direction, the movement of the hollow piston 3 is limited by a circlip or snap-ring 16 inserted into the bore 2.

A further ball check valve 17 is installed centrally into the mounting member 14, which opens in the direction toward the pressure space 12 of the hollow piston at a pressure of about 0.2 bar. It is in communication by way of a cross channel 18 and an annular groove 19 of the mounting member 14 as well as by way of an adjoining bore 20 of the hydraulic housing 1 with a cylindrical ante-chamber 21 which is disposed parallel to the bore 2 of the hydraulic housing 1. The ante-chamber 21 is closed at the top by a ring 22, into which is inserted centrally a ball-type excess pressure valve 23 opening in the direction toward the atmosphere. A spray pipe 24 is inserted into the central bore of the ring 22 disposed above the ball excess pressure valve 23, whose bent-free end is directed toward a chain (not shown) of the internal combustion engine. The ante-chamber 21 is connected by way of a radial throttle bore 25 with a channel 26 that establishes a connection with the oil supply of the internal combustion engine.

Whereas an average pressure of about 2 bar prevails in the pressure space 12, it may increase up to 30 bars as a result of chain blows or impacts on the hollow piston 3. These pressure peaks are reduced by way of the check valve 9, 10 and the threaded grooves 6 of the throttle plug 4. At the same time, the oil-air mixture which has collected in the upper area of the pressure space 12 reaches the atmosphere through the expansion space 8 along the threaded grooves 6. The opening movement of the ball 9 assists this venting flow since it is guided within the expansion space 8 and acts as displacement body.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A hydraulic chain tightener for internal combustion engines, comprising hollow piston means longitudinally movably guided within a bore of a hydraulic housing and serving for the chain tensioning, said hollow piston means being connected at one end to a pressures space means and including at its opposite end a throttling plug means facing the chain, the air being able to escape out of the hydraulic housing means by way of the throttling plug means, characterized in that an expansion space means is formed between the throttling plug means and the pressure space means, which is adapted to be closed with respect to the pressure space means by a check valve means.

2. A chain tightener according to claim 1, in which the check valve means includes a valve seat, characterized in that the throttling plug means is pressured into a bore of the hollow piston means which extends substantially up to the check valve seat, and in that a bore in the hollow piston means serving as pressure space means is formed coaxially thereto on the other side of the check valve seat.

3. A chain tightener according to claim 2, characterized in that the check valve means includes a ball and a coil spring, said coil spring being supported against the end face of the throttling plug means and pressing the ball, which is longitudinally guided in said first-mentioned bore, against the check valve seat.

4. A chain tightener according to claim 1, characterized in that the check valve means includes a ball and a coil spring, said coil spring being supported against the end face of the throttling plug means and pressing the ball which is longitudinally guided in said first-mentioned bore, against a check valve seat.

* * * * *